Jan. 2, 1968 T. R. REINHART 3,361,944
PROBE ASSEMBLY FOR CAPACITANCE TYPE MONITORING DEVICE
Filed April 24, 1964 2 Sheets-Sheet 1

INVENTOR
T. R. REINHART
BY *Theodore E. Bieber*
HIS ATTORNEY

Jan. 2, 1968  T. R. REINHART  3,361,944
PROBE ASSEMBLY FOR CAPACITANCE TYPE MONITORING DEVICE
Filed April 24, 1964  2 Sheets-Sheet 2

INVENTOR
T. R. REINHART
BY *Thomas E. Bieber*
HIS ATTORNEY

United States Patent Office 3,361,944
Patented Jan. 2, 1968

3,361,944
PROBE ASSEMBLY FOR CAPACITANCE TYPE MONITORING DEVICE
Tom R. Reinhart, New Orleans, La., assignor to Shell Oil Company, New York, N.Y., a corporation of Delaware
Filed Apr. 24, 1964, Ser. No. 362,375
2 Claims. (Cl. 317—246)

ABSTRACT OF THE DISCLOSURE

A probe for a capacitance monitoring system, the probe being designed to resist the abrasive action of a flowing fluid. The probe is provided with end pieces formed of wear-resistant material and is symmetrical about its vertical axis to permit reversing the probe when one end piece wears.

---

This invention pertains to water content monitor and more particularly to a probe for a water content monitoring system in which a change in capacitance of the probe is used as a measure of the water content of a fluid stream.

Water content monitors that operate on the capacitance principle are well known. These monitors are used to measure the water content of various materials and fluids, for example, the water content of a crude oil stream flowing in a pipeline or the like. These systems have also been used to measure the moisture content of materials such as sand or building materials. In a capacitance type of monitoring system the material or fluid whose water content is to be measured is disposed as the di-eletcric material between the electrodes of the capacitor. For example, in the case where capacitance measurements are used to monitor the water content of a crude oil stream, one electrode is normally disposed in the center of the pipe carrying the crude oil and the pipe wall is used as the second electrode. The capacitance of the system is then measured and any change in capacitance is used as an indication of a change in the water content of the crude oil stream.

While capacitance monitoring systems are known, they have not been applicable for use under severe conditions as, for example, the monitoring of a stream containing abrasive materials. In the gas or air drilling of oil wells (hereinafter called air drilling), the discharge stream from the well contains high velocity gas and the entrapped formation cuttings. It is often desirable to know the water content of the discharge stream in order that one may know when the borehole or well penetrates a water-bearing formation. In a copending application of T. R. Reinhart, entitled, "Gas Drilling Monitoring System," Ser. No. 362,376, filed Apr. 24, 1964, now Patent No. 3,308,-894, there is disclosed and claimed a monitoring system for an air drilling apparatus. In this monitoring system the capacitance-type probe is used to monitor the water content of the discharge stream.

When prior art probes are used to monitor a discharge stream from an air drilling rig, the high velocity formation cuttings entrapped in the flowing air stream completely destroy the probe within a relatively short time. The impinging of the particles on the probe member completely errode away the metal members and destroy the probe. Even when attempts are made to encase the member in plastic or other deformable materials in order to absorb the energy of the high velocity particles, the probe is still destroyed.

This invention is directed to the solving of the above problem by providing a probe which is constructed of highly wear-resistant materials. In addition, the probe is of very rugged construction in order to withstand the impact of the high velocity formation cuttings. Also the probe is provided with a symmetrical shape that permits rotating the probe 180° to present a new wearing surface to the impinging particles. More particularly the probe is formed from a center or insulating section in which the central electrode of the capacitor is disposed. This center section is of a rectangular shape having a cross section to present a minimum cross sectional area in the direction of flow of the particles commensurate with strength requirements. Mounted on each end of the central section is a highly wear resistant deflector section. The reflector sections are formed from a highly wear resistant material, as for example tungsten carbide, and in addition are formed in a streamlined semicircular shape to assist in deflecting the high velocity formation cuttings to each side of the probe member. Thus, the complete probe member is of heavy construction and manufactured from highly wear-resistant materials. In addition, the life of the probe in the discharge stream is doubled by providing a simple means for rotating the probe 180° to present a new wearing surface to the direction of flow of the particles.

The above advantages of this invention will be more easily understood from the following detailed description of a preferred embodiment when taken in conjunction with the attached drawings in which.

Figure 1:
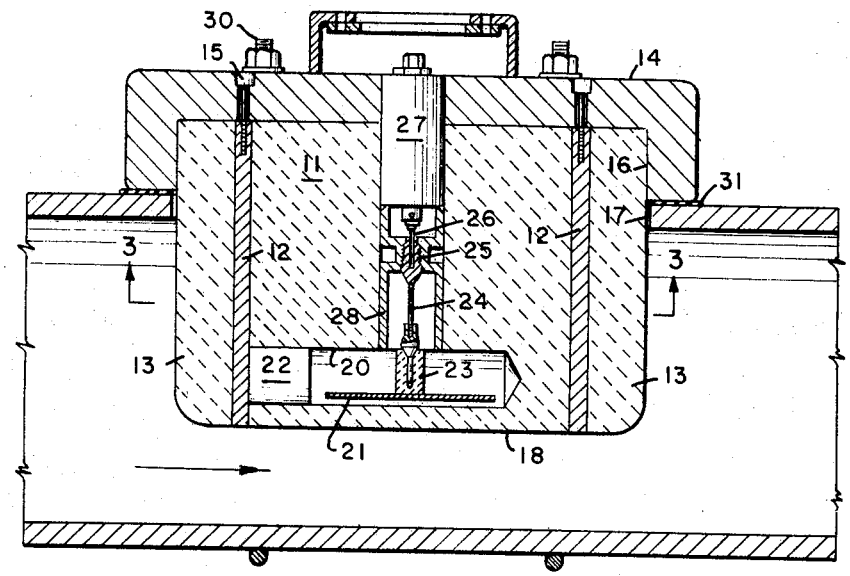
FIGURE 1 is an elevation view shown in section of a preferred embodiment of the probe member installed in a pipeline.

Referring now to FIGURE 1, there is shown a probe member installed in a pipeline 10. The pipeline 10 may be any type of pipeline in which is desired to measure the water content of the material flowing therein. For example, the pipeline could be a crude oil pipeline or a discharge line for an air-drilling apparatus. Air-drilling discharge lines are usually referred to as the blowlines and serve to conduct the compressed gaseous fluid and entrained formation cuttings and dust from the annulus of the well to a suitable discharge pit. In air-drilling operations, gaseous fluid, normally either air or natural gas, is compressed to a relatively high pressure on the order of 100–200 pounds per square inch and circulated down the drill string to transport the cuttings that are removed by the rotating drill bit to the surface. The compressed gas picks up the formation cuttings and conveys them to the surface where they are discharged through the blowline 10. Air-drilling operations can proceed satisfactorily only as long as the well remains dry and relatively free of water. In case of water flowing into the well, the formation cuttings and dust are converted to a mud which then cakes on the drill string and the borehole walls where it cannot be removed by the flowing stream of high-pressure gas. Normally detection of water in the well has been obtained by visually observing the discharge end of the blowline 10. As long as the discharge creates a dust cloud due to the fine particles entrained in the compressed gas stream, it is assumed that the well has not encountered a water-bearing formation. When the discharge stream ceases to dust, it is assumed that the well has encountered a water-bearing formation. As explained in the above-referenced copending application, this is a very crude and inaccurate indication of water and can result in considerable errors in calculations based thereon.

Figure 2:
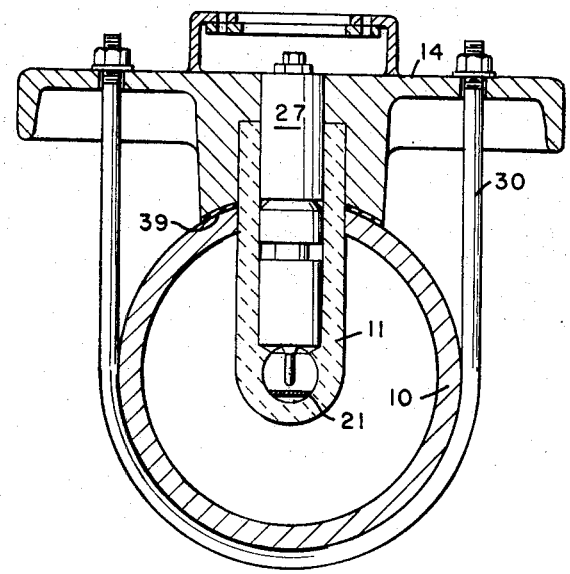
FIGURE 2 is a cross section taken along line 2—2 of FIGURE 1 showing an end section of the probe member.
Figure 3:
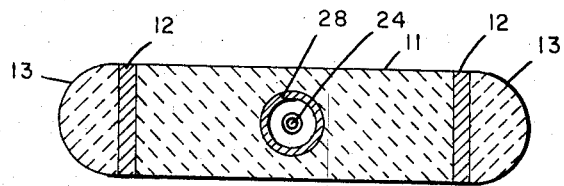
FIGURE 3 is a horizontal section taken along line 3—3 of FIGURE 1 showing the horizontal section of the probe member.

The probe of this invention is inserted into line 10 through an oblong shaped opening 17 cut in the wall of the pipe 10. The opening 17 can be a relatively rough and inaccurate opening since the probe is sealed to the wall of the pipe by other means. The probe consists of a central section 11 that is formed of a ceramic material that has good electrical insulating properties. For example, a heavy duty ceramic material used in electrical insulators can be used for forming the central section 11. The section 11 as shown in FIGURES 1–3 has a general rectangular shape rounded at the end 18 that projects into the pipe 10. Further, the central section 11 has a relatively small cross sectional area in a direction transverse to the flow through the pipe. This is necessary in order to present a minimum of resistance to the flow through the pipe 10.

Attached to each end of the central section 11 are two steel adaptor plates 12. The steel adaptor plates have the same general cross section as the central section shown in FIGURE 2. In addition, the steel adaptor plates are bonded to the ceramic material by well-known means as for example by the use of epoxy-type adhesives. The ends of the central section 11 are covered by two deflector pieces 13 having a semicircular cross section. The deflector pieces 13 must be formed of a material having good abrasion resisting properties, as for example, tungsten carbide. The cross sectional shape of the deflector pieces is chosen to assist in deflecting the formation cuttings contained in the discharge air stream. The assembly of ceramic insulator 11 and the two end deflecting pieces 13 are retained in a cavity 16 formed in a mounting bracket 14 by means of capscrews 15 that pass through openings in the mounting bracket 14 and thread into the steel plates 12.

Center insulating member 11 is provided with a horizontal recess 20 preferably having a circular shape which is closed at its open end by means of a ceramic plug 22. The center electrode 21 of the capacitor is mounted in the cavity 20 by means of a center post 23 which is attached to a spacing element 28. The post or center electrode 23 is coupled to an extension member 24 whose upper end forms a female connection 25. A male connector 26 positioned on the end of the capacitance transducer 27 used to complete the circuit from the center electrode to the external measuring circuit as shown in FIGURE 4.

The capacitance probe is retained in the pipe 10 by means of two U-bolts 30 which pass around the pipe 10 as shown in FIGURE 2 and serve to securely clamp the mounting member 14 to the pipe 10. In addition, a sealing gasket 31 is placed between the inner surface 39 of the member 14 and the outer wall of the pipe 10. It should be noted that the inner surface 39 of the mounting member 14 is shaped to conform substantially to the outer shape of the pipe 10. This insures a tight seal between the mounting member 14 and the pipe wall 10 and in addition provides a rigid mounting for the capacitance probe in the pipe 10.

Figure 4:
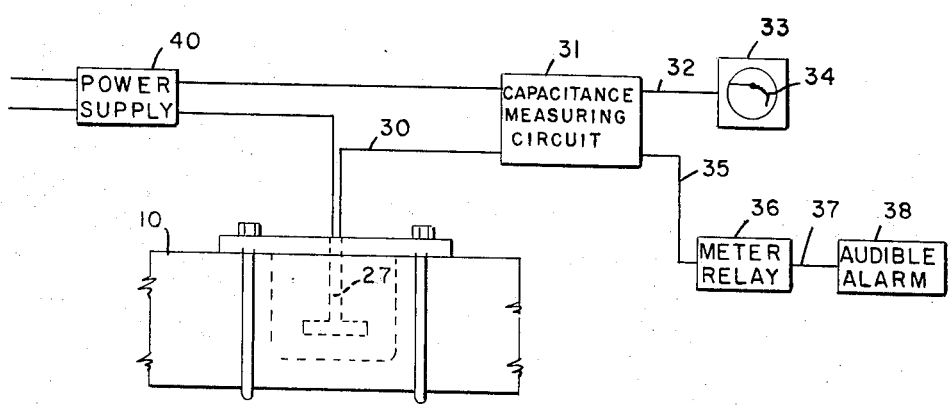
FIGURE 4 is a block diagram of a suitable circuit for measuring the capacitance of the probe member.

Referring now to FIGURE 4 there is shown in block diagram form a suitable circuit for measuring the change in the di-electric constant of the material flowing through the pipe 10 shown in FIGURES 1 and 2. The capacitance transducer 27 which may be a commercially available transducer and serves to convert the capacitance between the center electrode 21 and the wall of pipe 10 to a related electrical signal. More particularly, the capacitance transducer 27 may be a unit manufactured by the Decker Corporation of Bala-Cynwyd, Pa. This tranducer as supplied by the manufacturer may be used to convert the capacitance of a capacitance measuring probe to a related electrical signal.

The capacitance probe is powered by means of power supply 40 that converts a source of power 41 to an oscillating signal required by the probe. The probe is coupled by means of a lead 30 to a capacitance measuring circuit 31 which may be a normally balanced amplifier that becomes unbalanced when the di-electric constant of the material flowing in the pipe 10 changes, thus changing the capacity of the capacitance probe. The capacitance measuring circuit may also be a commercially available unit, for example, a Decker Delta Unit Model 904–1, manufactured by the Decker Corporation referred to above. The output side of the capacitance measuring circuit 31 is coupled by means of a lead 32 to a chart recorder 33. The chart recorder 33 is shown as being a circular chart recorder that provides a record 34 indicating the capacitance of the probe with respect to time. The recorder 33 is driven by a clock mechanism that rotates the chart record once every twenty-four hours. The record 34 is directly related to the di-electric constant of the material flowing in the pipeline 10 and thus can be related directly to the water content of the material flowing in the pipe 10. The output side of the capacitance measuring circuit 31 is also coupled by means of a lead 35 to a meter relay 36. The meter relay 36 is adjusted to operate whenever the signal from the capacitor measuring circuit 31 exceeds a preset level. The meter relay 36 is in turn coupled by means of a lead 37 to an audible alarm 38. The alarm unit serves to alert operating personnel that preset limits for the water content of the discharge stream have been exceeded.

The above-described probe when used to measure the water content of a discharge line from a gas drilling rig is very sensitive. For example, the di-electric constant of stone and rocks normally contained in earth formations never exceeds 12 while the di-electric constant of water is 80. Thus, it is seen that the probe will produce minimum increase in capacitance of approximately ten times that of an equal amount or rock whenever water is present in the discharge line. Thus, it is seen that the sensitivity of the capacitance probe will be extremely good and capable of measuring very small increases in the water content of the return gas stream from a gas drilling operation.

Similarly, the probe as a result of its rugged construction and particularly the use of a symmetrical design will have a long operating life even when subject to the abrasive action of the rock particles contained in the return gas stream. In addition, the useful operating life of the probe is increased by the use of extremely wear-resistant material for forming the end deflecting pieces of the probe. As indicated above, tungsten carbide is a suitable material from which the end pieces may be formed. In addition, the end piece sare provided with a cross sectional shape that assists in deflecting the impinging rock particles from the probe.

I claim as my invention:

1. A probe for a capacitance monitoring system, said probe having a central electrode adapted for insertion in a tubular member, said tubular member forming the second electrode, said probe comprising:

a rectangular shaped center section formed of an insulating material, said center section being provided with a central cavity, said central cavity receiving the central electrode of the probe;

identical end pieces disposed at opposite ends of said center section, said end pieces being formed of a wear resistant material and having a semicircular cross section to minimize turbulence and wear in flow around the member;

a base member, said base member being disposed to be mounted on said tubular member, said center section and end pieces being mounted on said base member and extending into said tubular member.

2. A probe for a capacitance monitoring system, said probe having a central electrode and being adapted for insertion in an oblong opening formed in the wall of a tubular member, said tubular member forming the second electrode of said probe, said probe comprising:

a rectangular shaped center member, said center member being formed of a material with high insulating properties and having a cavity formed therein, said cavity receiving the central electrode of the probe element, the axis of said cavity being substantially parallel with the axis of the tubular member;

end pieces for the opposite ends of said center member, said end pieces having a semicircular cross section and being of sufficient length to cover the exposed ends of the center member, said end pieces in addition being formed of a wear resistance material;

a mounting member having one surface formed to fit the outer surface of the tubular member, said mounting member having a recess formed in said one surface to receive said center member and said end pieces;

and means for establishing an electrical connection with the electrode disposed in the center member.

References Cited

UNITED STATES PATENTS 2,720,624   10/1955   Gunst   317—246 X
3,200,312   8/1965   Callahan   317—246

LEWIS H. MYERS, *Primary Examiner.*

E. GOLDBERG, *Assistant Examiner.*